United States Patent [19]

Smith

[11] 3,806,890

[45] Apr. 23, 1974

[54] ASSOCIATIVE MEMORY INCLUDING A RESOLVER

[75] Inventor: Nicholas Kimbrough Smith, Naperville, Ill.

[73] Assignee: Bell Telephone Laboratories, Incorporated, Murray Hill, Berkeley Heights, N.J.

[22] Filed: Dec. 19, 1972

[21] Appl. No.: 316,571

[52] U.S. Cl. .......... 340/172.5
[51] Int. Cl. .......... G11c 15/00
[58] Field of Search .......... 340/172.5

[56] References Cited

UNITED STATES PATENTS

| | | | |
|---|---|---|---|
| 3,406,380 | 10/1968 | Bradley et al. | 340/172.5 |
| 3,456,243 | 7/1969 | Cass | 340/172.5 |
| 3,602,899 | 8/1971 | Lindquist et al. | 340/172.5 |
| 3,634,829 | 1/1972 | Campi et al. | 340/172.5 |

*Primary Examiner*—Paul J. Henon
*Assistant Examiner*—Paul R. Woods
*Attorney, Agent, or Firm*—John C. Albrecht

[57] ABSTRACT

An access resolver is disclosed for use in an associative memory containing a plurality of storage locations in an ordered arrangement. In response to an associative search operation all storage locations containing data matching an associative search criterion are identified as candidates for accessing. The resolver selects for accessing the candidate location which, according to a predetermined criterion for the ordered arrangement, is nearest to the location last accessed.

14 Claims, 8 Drawing Figures

| LOCATION ACCESS CONTROL CCT TRUTH TABLE | | | | |
|---|---|---|---|---|
| SIGNALS AT | | | | |
| Q | $L_M$ | $P_{IL}$ | D | $P_{OL}$ |
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 0 | 1 |
| 1 | 0 | 1 | 0 | 1 |
| 1 | 1 | 0 | 0 | 1 |
| 1 | 1 | 1 | 1 | 1 |

MODULE ACCESS CONTROL CCT TRUTH TABLE

| SIGNALS AT | | | | | | |
|---|---|---|---|---|---|---|
| K | $E_I$ | $P_{IM}$ | $M_W$ | $M_M$ | $E_O$ | $P_{OM}$ |
| 0 | 0 | 0 | 0 | 0 | 0 | 0 |
| 0 | 0 | 0 | 1 | 0 | 0 | 0 |
| 0 | 0 | 1 | 0 | 1 | 1 | 0 |
| 0 | 0 | 1 | 1 | 1 | 0 | 1 |
| 0 | 1 | 0 | 0 | 0 | 1 | 0 |
| 0 | 1 | 0 | 1 | 0 | 0 | 1 |
| 0 | 1 | 1 | 0 | 1 | 1 | 0 |
| 0 | 1 | 1 | 1 | 1 | 0 | 1 |
| 1 | 0 | 0 | 0 | 1 | 0 | 0 |
| 1 | 0 | 0 | 1 | 1 | 0 | 0 |
| 1 | 0 | 1 | 0 | 1 | 1 | 0 |
| 1 | 0 | 1 | 1 | 1 | 0 | 1 |
| 1 | 1 | 0 | 0 | 1 | 1 | 0 |
| 1 | 1 | 0 | 1 | 1 | 0 | 1 |
| 1 | 1 | 1 | 0 | 1 | 1 | 0 |
| 1 | 1 | 1 | 1 | 1 | 0 | 1 |

ASSOCIATIVE MEMORY INCLUDING A RESOLVER

BACKGROUND OF THE INVENTION

1. Field of the Invention

This invention relates to the field of associative memories and, more particularly, to associative memories which include access resolving apparatus.

2. Description of the Prior Art

In an associative memory a storage location is identified by the data stored in it. More specifically, to identify a storage location, a search is conducted for a location in which data having a specified characteristic are stored. The desired characteristic is referred to as the search criterion. After a location containing data matching the search criterion is identified, it can be accessed for purposes of reading the contents of the entire location or for writing new data into the location. It is often the case, however, that more than one location may contain data matching the search criterion. In such a situation a plurality of locations are candidate locations for accessing purposes. Apparatus is, therefore, required to select one location for accessing from the plurality of candidate locations. The apparatus used for this purpose is referred to as an access resolver.

The particular storage location selected by an access resolver from the plurality of storage locations containing data matching the search criterion is determined in the prior art by the relative resolving priorities of the candidate storage locations. Specifically, the candidate storage location with the highest priority is selected. Moreover, in prior art resolvers the resolving priority of each storage location is fixed and is not varied as a function of the storage locations which have been identified and accessed previously except under program control. Thus, using a prior art resolver, if there is no intervention under program control, an associative search conducted a plurality of times using the same search criterion results in the selection of the same highest priority storage location each time even though there may be a plurality of candidates. As a result, if it is desired that each of the plurality of candidate locations be identified, program controlled intervention in the search process is required. In one method of program controlled intervention, the data stored in the selected highest priority location are modified to prevent the data from matching the search criterion on a subsequent associative search. As a result, in the succeeding associative search operations the previously selected locations are no longer candidate locations. In other methods, certain flip-flops associated with the storage locations are set under program control to redirect the next associative search to other memory areas. While such methods are effective, they require time and the execution of specific program instructions. Greater efficiency in searching for each of a plurality of locations containing data matching a search criterion would be achieved if nonproductive program steps were eliminated. More specifically, greater efficiency would result if a sequence of associative searches using the same search criterion would result in the selection for accessing of each of the appropriate storage locations without requiring program controlled intervention.

SUMMARY OF THE INVENTION

In a memory according to applicant's invention, the selection of a storage location for accessing is controlled by the relative positions of the candidate locations in an ordered arrangement with respect to the last location selected for accessing. In a specific embodiment of applicant's invention, the storage locations in the memory are grouped into memory modules. A module access circuit is provided for each module and the module access circuits are connected in series by a reentrant signal propagation line. In operation, the memory module containing the storage location last selected for accessing is designated by a unique code stored in a register. In general, the module access circuit associated with the so designated memory module generates a control signal which controls the selection of the next storage location for accessing. This control signal is propagated to the succeeding module access circuits on the propagation line. When a search for a storage location containing data matching a search criterion is initiated, each module access circuit which receives the control signal and is associated with a memory module containing no storage location storing data matching the search criterion, propagates the control signal to the succeeding module access circuit. However, the module access circuit associated with the memory module containing the storage location which is the first location, succeeding the last selected location, to store data matching the search criterion, terminates the propagation of the aforementioned control signal to succeeding module access circuits on the propagation line. As a result, only a storage location in the memory module associated with the terminating module access circuit can be selected for accessing. In response to timing signals, a code designating the memory module containing the location for accessing is stored in the aforementioned register.

DESCRIPTION OF THE ILLUSTRATIVE EMBODIMENT

Figure 1:
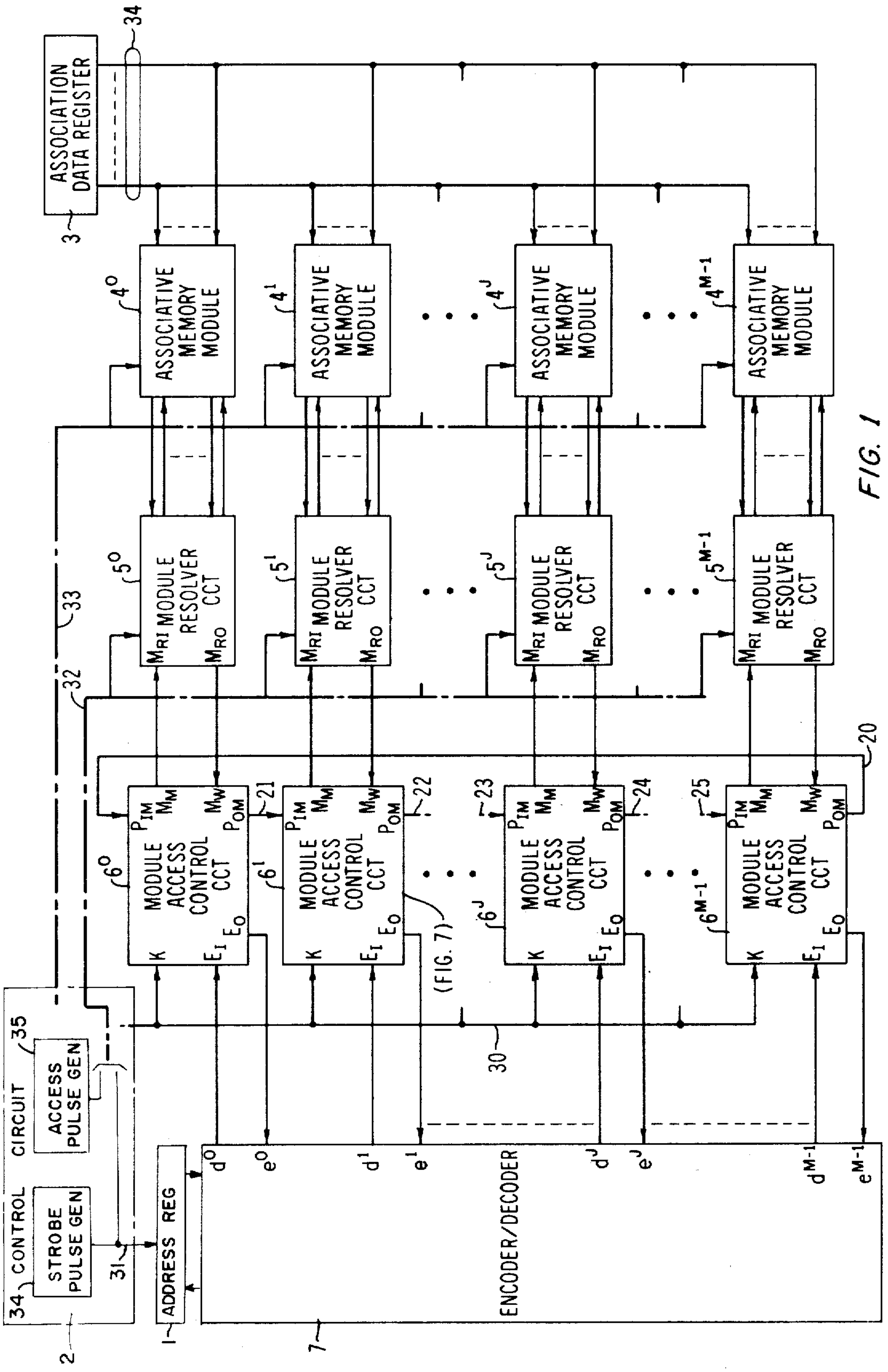
FIG. 1 shows a block diagram representation of an associative memory system embodying applicant's invention.

A block diagram representation of an associative memory arrangement embodying applicant's invention is shown in FIG. 1. It can be seen that M associative memory modules 4 are provided. Each of these modules 4 is connected by means of lines 34 to association data register 3 which is used to store the data specifying the associative search criterion. Individually associated with each of the associative memory modules 4 is a module resolver circuit 5 which receives signals from each of the N storage locations in the respective associative memory module 4 which signals indicate whether or not the respective locations store data matching the current associative search criterion stored in data register 3. The module resolver 5 control the accessing of the storage locations in the respective associative memory modules 4. Individually associated with each module resolver circuit 5 is a module access control circuit 6. The module access control circuits 6 are connected together by a reentrant module propagation bus including the lines 20, 21, 22, 23, 24, and 25. Signals generated by one of the module access control circuits 6 in response to signals from its associated module resolver circuit 5 and the encoder/decoder 7 are propagated along the module propagation bus to other module access control circuits 6. These signals are used in determining which associative memory module contains the candidate storage location which is to be accessed.

With the above general discussion of the operation of the arrangement shown in FIG. 1 in mind, attention is now turned to a detailed discussion of the operation of the arrangement. A discussion will first be presented of the operation of one of the module resolver circuits 5 in conjunction with an associative memory module 4.

MODULE RESOLVER CIRCUIT

Figure 2:
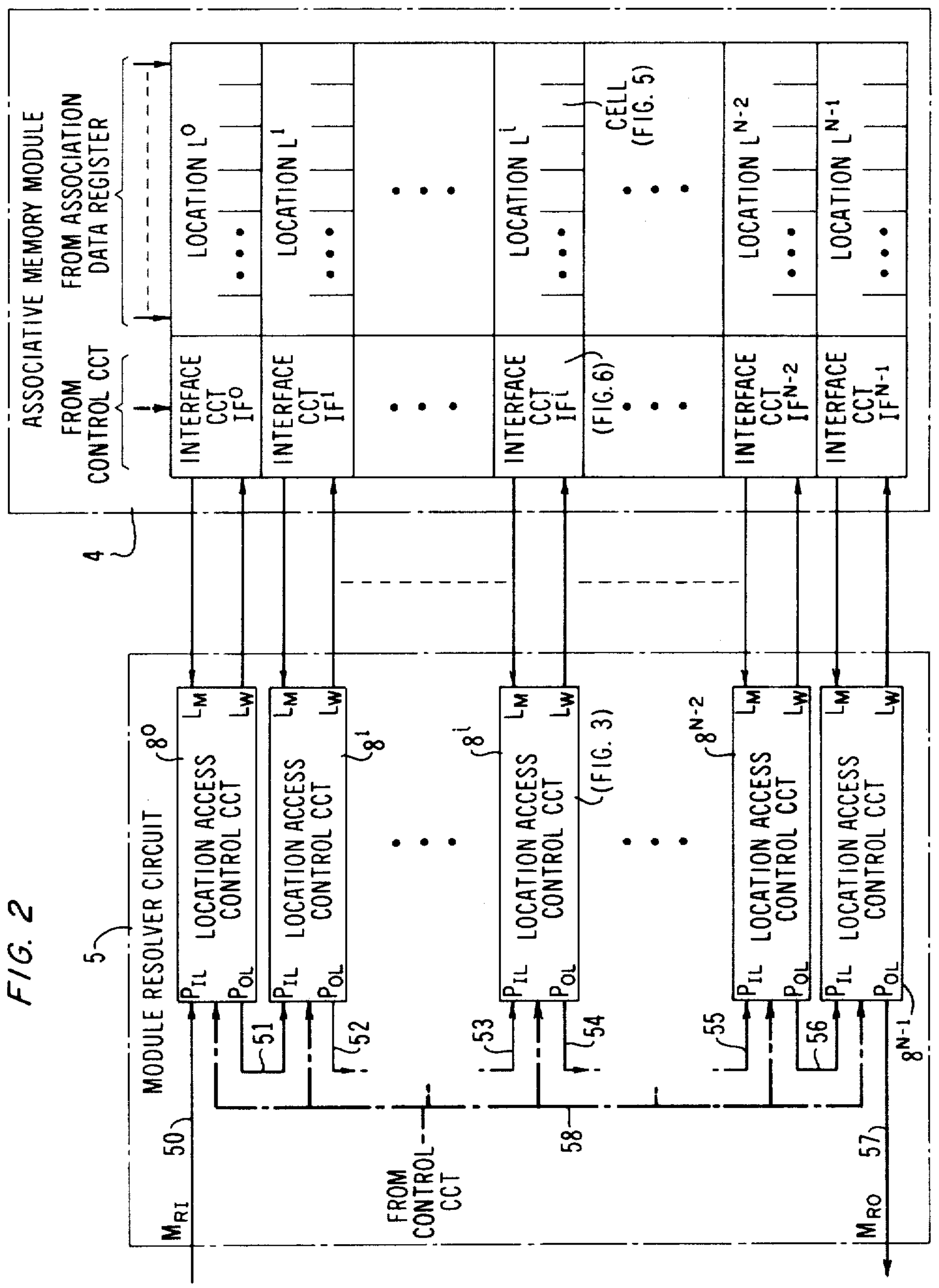
FIG. 2 shows a block diagram representing a module resolver circuit and associative memory module shown in FIG. 1.

A block diagram representation of a typical module resolver circuit 5 is shown in FIG. 2 together with a block diagram representation of a typical associative memory module 4. The module receiver circuit 5 (FIG. 2) contains a plurality of location access control circuits 8. Typically, the location access control circuit $8^i$ is associated with a storage location $L^i$ in the memory module 4. The control circuit $8^i$ is interconnected with its associated storage location $L^i$ in the memory 4 by two lines. The signal on the line from the storage location $L^i$ to the $L_M$ input of the control circuit $8^i$ is equal to logical "1" when the data contained in the association data register 3 (FIG. 1), comprising the search criterion, matches the data stored in the storage location $L^i$ (FIG. 2). The signal on the line from the $L_W$ output of the location access control circuit $8^i$ to the location $L^i$ is equal to logical "1" when the storage location $L^i$ is to be accessed for reading or writing purposes.

Figure 5:
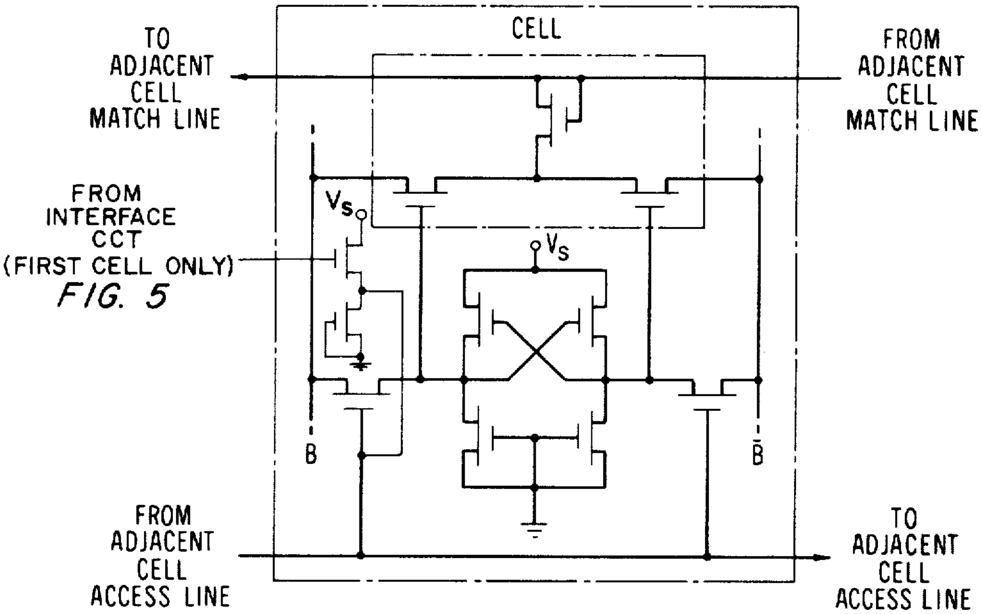
FIG. 5 shows a schematic diagram of a cell suitable for use in the memory module shown in FIG. 2.
Figure 6:
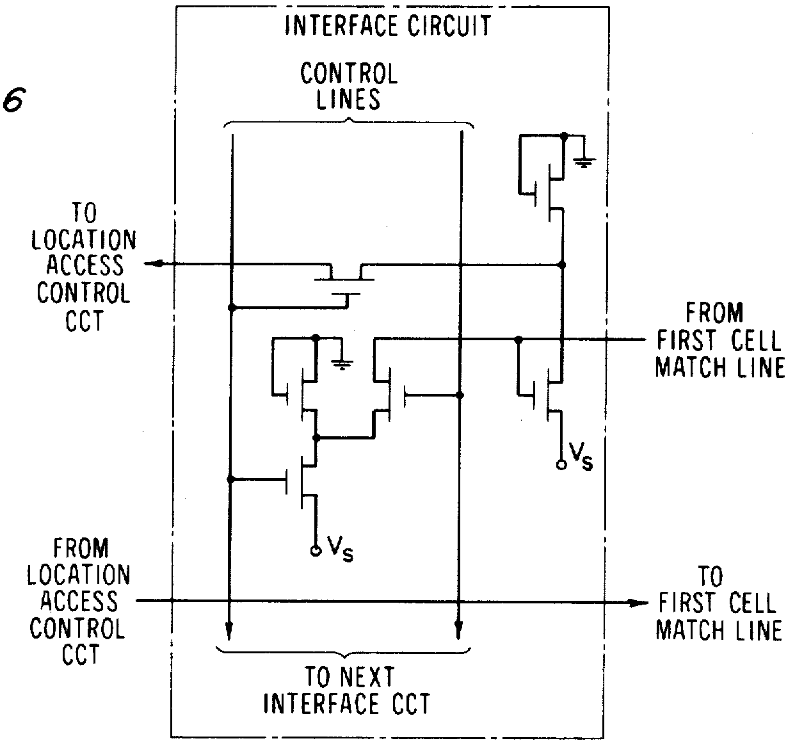
FIG. 6 shows a schematic diagram of an interface circuit suitable for use in the memory module shown in FIG. 2.

The memory modules 4 do not form a pair of this invention and the specific structure of the memory modules 4 is important only in that there must be consistency of signals as described above. A plurality of memory structures and designs are known in the prior art, any of which could be used as the memory modules 4 (FIG. 1). For example, the following patents show memories, together with the appropriate control circuitry, any of which could serve as the memory modules 4: R. J. Koerner et al., U.S. Pat. No. 3,284,775, issued Nov. 8, 1966; R. J. Koerner et al., U.S. Pat. No. 3,402,398, issued Sept. 17, 1968; A. B. Lindquist et al., U.S. Pat. No. 3,602,899, issued Aug. 31, 1971. For convenience a circuit suitable for use as a cell in the memory modules 4 is shown in FIG. 5. One such cell is required for each storage bit. The B and $\overline{B}$ lines carry signals representing a bit and its complement, respectively, from the association data register 3 (FIG. 1). One such set of B and $\overline{B}$ lines is required for each bit in the register 3. The typical interface circuit $IF^i$ operates upon signals appearing on the cell match line (FIG. 5) for the location $L^i$ (FIG. 1) to produce the aforementioned "1" signal when the stored data matches the search criterion. A typical interface circuit is shown for convenience in FIG. 6.

Figures 3, 4:
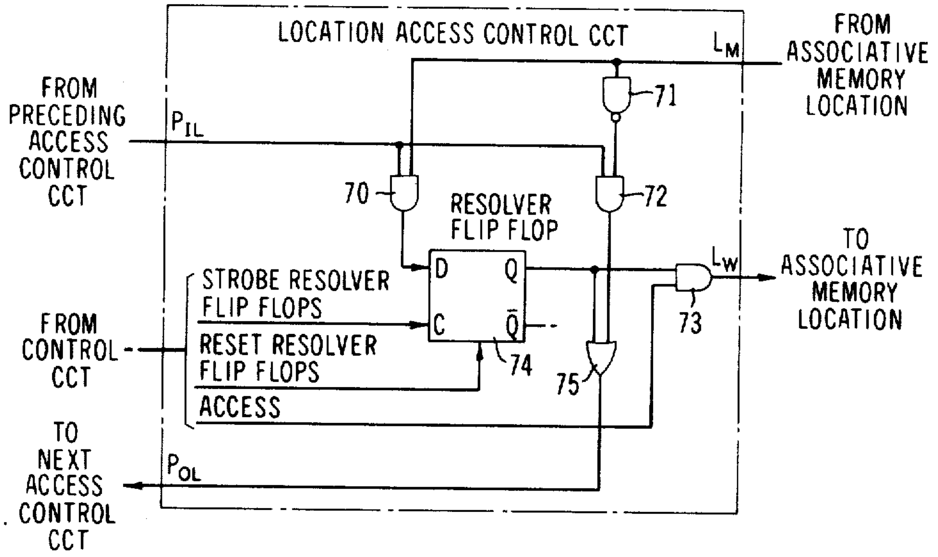
FIG. 3 shows a schematic diagram of a location access control circuit.
FIG. 4 shows a truth table for a location access control circuit.

One embodiment of a location access control circuit is shown in detail in FIG. 3. As can be seen therein, the circuit contains a resolver flip-flop 74, which in this illustrative embodiment of applicant's invention is a D flip-flop. As is well known, a D flip-flop assumes the logical state of the signal present at its D input when a strobe signal is applied to its C input. It should be noted that while each of the interconnected location access control circuits 8 in FIG. 2 contains a resolver flip-flop 74 (FIG. 3), only the resolver flip-flop for one of the location access control circuits 8 (FIG. 2) is in the set state at any one time. In addition, it should be noted that a truth table representing the logical functions performed by a location access control circuit 8 (FIG. 3) is shown in FIG. 4. The significance of the requirement that only one resolver flip-flop be set at a time and the operation of the location access control circuits will be illustrated by the discussion which follows.

It should be noted in FIG. 2 that the location access control circuits 8 are interconnected. The typical location access control circuit $8^i$ receives signals at its $P_{IL}$ input from the preceding location access control circuit and generates signals at its $P_{OL}$ output for propagation to the succeeding location access control circuit. The lines interconnecting the location access control circuits, specifically, the lines 50, 51, 52, 53, 54, 55, 56, and 57, are all part of what will be referred to as a location propagation bus. It should be noted that the lines 50 and 57 are connected to the $M_{RI}$ input and the $M_{RO}$ output, respectively, of the module resolver circuit 5. The use of this location propagation but will become clear in the subsequent discussion.

The location access control circuits 8 shown in FIG. 2 operate together in the module receiver circuit 5 to determine which one, if any, of the storage locations in the memory module 4 is to be accessed in response to an associative search operation. The determination is based on the relative positions on the location propagation bus of the location access control circuits 8 for storage locations containing data matching the associative search criterion. The detailed operation of the module resolver circuit 5 will be shown by an illustrative example.

To illustrate the operation of the module resolver 5 (FIG. 2) it is first assumed that the flip-flop 74 (FIG. 3) in the location access control circuit $8^0$ (FIG. 2) is in the set state. It will be recalled that only one resolver flip-flop can be in the set state at one time, under normal operation. Referring to the truth table shown in FIG. 4, when the resolver flip-flop 74 (FIG. 3) in a location access control circuit 8 is in the set state, indicated by the signal at the Q output of the flip-flop being equal to "1," the signal at $P_{OL}$ is equal to "1." Therefore, a signal equal to logical "1" appears on line 51 (FIG. 2) and is applied to the $P_{IL}$ input of location access control circuit $8^1$. It is assumed that, at this point, an associative search operation is initiated in which association data is placed in the association data register 3 (FIG. 1) to be compared in parallel with the data stored in each of the N storage locations in memory module 4 (FIG. 2). It is further assumed, for purposes of illustration, that the signals applied to the $L_M$ inputs of all of the location access control circuits except circuits $8^{N-2}$ and $8^{N-1}$ are equal to "O," indicating that the data stored in the storage locations corresponding to the respective access control ciruits do not match the search criterion. The signals on the $L_M$ inputs of the access control circuits $8^{N-2}$ and $8^{N-1}$ are assumed to be equal to "1," indicating an associative match for the data stored in locations $L^{N-2}$ and $L^{N-1}$, respectively.

Under the above assumed conditions it should be observed that the signal applied to the $P_{IL}$ input of the location access control circuit $8^1$ is equal to "1" while the signal applied to the $L_M$ input of that circuit is equal to "O." In addition, since the resolver flip-flop 74 (FIG. 3) in the location access control circuit $8^0$ (FIG. 2) is in the set state, the resolver flip-flop 74 (FIG. 3) in each of the other location access control circuits, including the circuit $8^1$ (FIG. 2), is in the reset state. In view of these assumed conditions for the access control circuit $8^1$, it can be seen from the truth table shown in FIG. 4 that the signal generated by the access control circuit $8^1$ (FIG. 2) at its $P_{OL}$ output is equal to "1." Thus, the "1" applied to the $P_{IL}$ input of the location access control circuit $8^1$ is propagated to the $P_{OL}$ output of that circuit. Moreover, since all of the location access control circuits intervening on the location propagation bus between the circuit $8^1$ and the circuit $8^{N-2}$ are subjected to the same conditions as is the circuit $8^1$, the "1" signal appearing at the $P_{OL}$ output of the location access control circuit $8^1$ continues to propagate until it appears on line 55 at the $P_{IL}$ input of the location access control circuit $8^{N-2}$.

It will be recalled that the signal on the $L_M$ input of the location access control circuit $8^{N-2}$ is equal to "1," indicating that the data stored in location $L^{N-2}$ associatively matches the current contents of the association data register 3 (FIG. 1). It is important to note in the truth table shown in FIG. 4 that the signal on the $P_{OL}$ output of a location access control circuit (FIG. 3) is equal to "O" when the Q output of the resolver flip-flop 74 equals "O" and signals equal to "1" are applied to both the $P_{IL}$ and the $L_M$ inputs of the location access control circuit. As a result, under the assumed conditions, the signal generated at the $P_{OL}$ output of the location access control circuit $8^{N-2}$ (FIG. 2) and applied to the $P_{IL}$ input of the location access control circuit $8^{N-1}$ by means of line 56 is equal to "O." Thus, it should be observed that, as a result of the signal applied to the $L_M$ input of the location access control circuit $8^{N-2}$ being equal to "1," the "1" signal applied to the $P_{IL}$ input of the circuit $8^{N-2}$ does not propagate through the circuit $8^{N-2}$ to the $P_{OL}$ output of that circuit. In addition, it should be observed that under these conditions the truth table (FIG. 4) indicates that the signal at the D input of the resolver flip-flop 74 (FIG. 3) for the circuit $8^{N-2}$ (FIG. 2) is equal to "1." Since this resolver flip-flop 74 (FIG. 3) is of the D type and is currently reset, a strobe pulse applied to the C input of the flip-flop will cause it to change state. The occurrence of strobe pulses is controlled by the control circuit 2 (FIG. 1) and will be discussed subsequently.

It will be recalled that a signal equal to "O" is applied to the $P_{IL}$ input of the access control circuit $8^{N-1}$ and that the signal applied to the $L_M$ input of that circuit equals "1." With the Q output of the resolver flip-flop 74 (FIG. 3) in the location access control circuit $8^{N-1}$ (FIG. 2) equal to "O," it can be seen in the truth table (FIG. 4) that the signal appearing at the $P_{OL}$ output of the circuit $8^{N-1}$ (FIG. 2) and on the line 57 is equal to "O." This "O" signal appears at the $M_{RO}$ output of the module resolver circuit 5. It is assumed here that external circuitry provides a conduction path for this signal to the $M_{RI}$ input of the module resolver circuit 5. As a result, the "O" signal is applied to the $P_{IL}$ input of the access control circuit $8^0$. Since the resolver flip-flop 74 (FIG. 3) in the circuit $8^0$ was assumed to be in the set state, the Q output of the flip-flop was initially equal to "1." Referring to the truth table of FIG. 4 it can be seen that the $P_{OL}$ output of the circuit $8^0$ remains equal to "1." It should also be noted, however, that under these conditions the signal appearing at the D input of the resolver flip-flop 74 (FIG. 3) in the location access control circuit $8^0$ (FIG. 2) is equal to "O." As a result, at the next occurrence of a strobe pulse applied to the C input (FIG. 3) of the flip-flop 74, the flip-flop 74 will change state. As mentioned above, the occurrence of this strobe pulse is controlled by the control circuit 2 (FIG. 1).

At a time following the initiation of the current associative search operation when the propagation of signals along the aforementioned propagation bus should be complete and the signals should have settled to the states described above, the control circuit 2 (FIG. 1) produces the aforementioned strobe pulse. The particular structure of the control circuit 2 is not part of the invention nor is an understanding of the detailed structure of the control circuit 2 necessary for an understanding of the invention. One skilled in the art will recognize that any one of a number of pulse generators known in the prior art would suffice as the strobe pulse generator 34 and access pulse generator 35. As indicated above, it is only important that the strobe pulse generator 34 in the control circuit 2 generate the strobe pulse after at least a specified interval following the initiation of the search operation and that, as indicated below, the strobe pulse be followed by an access pulse from the access pulse generator 35.

Following the generation of the strobe pulse, the pulse is conducted over the control signal bus 32 (FIG. 1) to each of the module resolver circuits. Referring to FIG. 2 the control signal bus 58 conducts the strobe pulse within the module resolver circuit 5 to each location access control circuit 8 wherein it is applied to the C inputs of the respective resolver flip-flop 74 (FIG. 3). Under the conditions described above, the resolver flip-flop 74 (FIG. 3) in the location access control circuit $8^{N-2}$ (FIG. 2) changes from the reset to the set state and, substantially simultaneously, the flip-flop 74 (FIG. 3) in the location access control circuit $8^0$ (FIG. 2) changes from the set to the reset state. Since the signal at the Q output of the flip-flop 74 (FIG. 3) in the location access control circuit $8^{N-2}$ (FIG. 2) is, as a result, equal to "1," the occurrence of a subsequent access pulse from the control circuit 2 (FIG. 1) will fully enable the AND gate 73 (FIG. 3) to produce a "1" signal at the $L_W$ output of the location access control circuit $8^{N-2}$ (FIG. 2). That signal will enable the accessing of the location $L^{N-2}$ in the memory module 4 (FIG. 2).

It will be recalled that it was assumed above that both locations $L^{N-2}$ and $L^{N-1}$ in memory module 4 (FIG. 2) contain data matching the search criterion. It is, therefore, important to note that the location $L^{N-2}$ and not the location $L^{N-1}$ was selected for accessing in the above described operation. This selection resulted from the fact that the location access control circuit $8^{N-2}$, for the location $L^{N-2}$, was nearer than the location access control circuit $8^{N-1}$, for the location $L^{N-1}$, on the location propagation bus to the location access control circuit $8^0$. It will be recalled that the location access control circuit $8^0$ was the initiation point for the "1" signal on the propagation bus since its resolver flip-flop 74 (FIG. 3) was in the set state. If, however, another associative search operation is conducted using the same search criterion, the location access circuit $8^{N-2}$ (FIG. 2) is now the initiation point for the "1" signal on the propagation bus since its resolver flip-flop 74 (FIG. 3) is in the set state. The location access control circuit $8^{N-1}$ (FIG. 2) for the location $L^{N-1}$ which stores data matching the search criterion, is the location access control circuit on the location propagation bus nearest to the location access control circuit $8^{N-2}$ for the location $L^{N-2}$. As a result, in a manner similar to that previously described, the new associative search operation, at the occurrence of a strobe pulse, results in the setting of the flip-flop 74 (FIG. 3) in the access control circuit $8^{N-1}$ (FIG. 2), the resetting of the flip-flop 74 (FIG. 3) in the access control circuit $8^{N-2}$ (FIG. 2), and the selection for accessing of the location $L^{N-1}$ in the memory module 4.

From the preceding discussion another observation should be made. If a "1" signal is initially applied to the $M_{RI}$ input of the module resolver 5 (FIG. 2) with all other conditions as originally assumed above, except that the resolver flip-flop 74 (FIG. 3) in the location access control circuit $8^0$ is not in the set state, the storage location $L^{N-2}$ is still selected for accessing. Under these conditions the "1" signal originates at the $M_{RI}$ input rather than at the $P_{OL}$ output of the locations access control circuit $8^0$. The "1" signal, however, propagates to the $P_{OL}$ output of the circuit $8^0$ in the same manner discussed above. Therefore, the signals applied to the location access control circuit $8^{N-2}$ are the same as they were when the resolver flip-flop 74 (FIG. 3) in circuit $8^0$ was in the set state in the discussion above. As a result, under these conditions, the flip-flop 74 (FIG. 3) in the location access control circuit $8^{N-2}$ (FIG. 2) is set and the storage location $L^{N-2}$ is selected for accessing.

In addition, it should be observed from the above discussion that where none of the resolver flip-flops 74 (FIG. 3) in the module resolver circuit 5 (FIG. 2) is set and there are no candidate storage locations in the associated memory module 4 (FIG. 2), a "1" signal applied to the $M_{RI}$ input of the resolver circuit 5 propagates to the $M_{RO}$ output of the module resolver circuit 5. If there is a candidate location, a "O" appears at the $M_{RO}$ output. Similarly, if one of the resolver flip-flops 74 (FIG. 3) in the module resolver circuit 5 (FIG. 2) is in the set state, thus initiating a "1" signal on the location propagation bus of the resolver circuit 5, but there is no candidate storage location whose associated location access control circuit 8 succeeds the initiating location access control circuit 8 on the location propagation bus, the "1" signal propagates to the $M_{RO}$ output of the resolver circuit 5. If there is a candidate storage location whose associated location access control circuit 8 succeeds the initiating access control circuit 8 on the location propagation bus, a "O" signal appears at the $M_{RO}$ output of the module resolver circuit 5 (FIG. 2).

Module Access Control Circuit and Encoder/Decoder

Figures 7, 8:
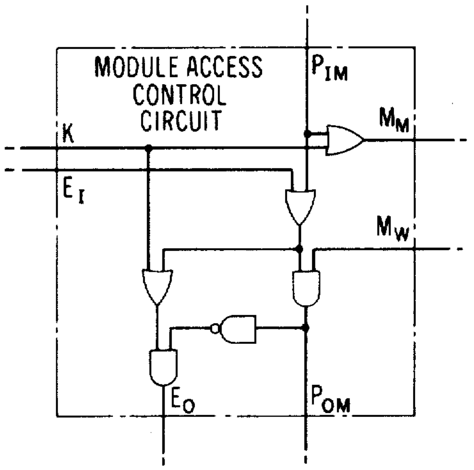
FIG. 7 shows a schematic diagram of a module access control circuit.
FIG. 8 shows a truth table for a module access control circuit.

A schematic diagram of circuit suitable for use as a module access control circuit 6 is shown in FIG. 7. A truth table defining the functions of the module access control circuit 6 is shown in FIG. 8. Initially, for the consideration of the operation of the module access control circuit 6 (FIG. 1), it will be assumed that the signal at the K input of the module access control circuit 6 (FIG. 1) is equal to "O."

The discussion of the operation of the module access control circuit 6 will be presented by means of an example. It is assumed in the following that the associative memory module $4^{M-1}$ contains the location last accessed and, as a result, the module resolver circuit $5^{M-1}$ contains the one resolver flip-flop 74 (FIG. 3) which is in the set state. Moreover, it is assumed that there are only three candidate storage locations containing data matching the new associative search criterion; two of the candidate storage locations are locations $L^{N-2}$ and $L^{N-1}$ in associative memory module $4^0$; and the other candidate storage location is location $L^0$ in associative memory module $4^1$. In view of the above discussion it should be observed that, under these conditions, the signal at the $M_{RO}$ output of the module resolver circuit $5^{M-1}$ is the "1" signal appearing on the location propagation bus of the circuit $5^{M-1}$. The location access control circuit 8 containing the set resolver flip-flop 74 (FIG. 2) is referred to as the initiating location access control circuit 8 for the "1" signal on the propagation bus.

It is further assumed that the encoder/decoder 7, in response to a code $c^{M-1}$ stored in the address register 1, generates a "1" signal at the $d^{M-1}$ output of the encoder/decoder 7 and generates "O" signals at the other outputs $d^0$ through $d^{M-2}$. The encoder/decoder 7 consists of a known 1-out-of-M encoder and a known 1-out-of-M decoder. In general, the encoder in the encoder/decoder 7 generates a unique code identifying the one input $e^j$ to which a "1" signal is applied out of the M inputs of the encoder. The decoder of the encoder/decoder 7 is responsive to that same unique code to generate a "1" signal at an output $d^j$, associated with the encoded input, and "O" signals at the other outputs. For this particular embodiment no input is encoded using an all "O" code since the presence of the all "O" code in the address register 1 is used to indicate the absence of a candidate location in any of the memory modules.

As a result of the above assumptions, a "1" signal from the $d^{M-1}$ output of the encoder/decoder 7 is applied to the $E_I$ input of the module access control circuit $6^{M-1}$. In addition, the "1" signal from the initiating access control circuit in module resolver $5^{M-1}$ is applied to the $M_W$ input of the control circuit $6^{M-1}$. Referring to the truth table in FIG. 8 it can be seen that, with these two input signals applied, the signal at output $P_{OM}$ is equal to "1," irrespective of the signal applied to the input $P_{IM}$. Thus, a "1" signal is generated on the aforementioned module propagation bus and is propagated on line 20 to the $P_{IM}$ input of the module access control circuit $6^0$.

It can be concluded from the truth table in FIG. 8 that in response to the "1" signal applied to the $P_{IM}$ input of the module access control circuit $6^0$ (FIG. 1), a "1" signal is generated at the $M_M$ output of that control circuit, irrespective of the signals applied to the other inputs. This "1" signal is applied to the $M_{RI}$ input of the module resolver circuit $5^0$. It will be recalled, from the above discussion, that a module resolver circuit 5 generates at its $M_{RO}$ output a "O" signal when, as here, a "1" signal is applied to its $M_{RI}$ input, all of its resolver flip-flops are reset and there is a candidate storage location in the associated memory module 4. Therefore, a "O" signal appears at the $M_{RO}$ output of the module resolver circuit $5^0$. This "O" signal is then applied to the $M_W$ input of the module access control circuit $6^0$. It can be seen in the truth table (FIG. 8) that the module access control circuit $6^0$ (FIG. 1), as a result of the input signals applied, generates a "1" signal at its $E_O$ output and "O" signal at its $P_{OM}$ output. The "1" signal at the $E_O$ output of module access control circuit $6^0$ is applied to the $e^0$ input of the encoder/decoder 7, while the "O" signal at the $P_{OM}$ output of the circuit $6^0$ is propagated to the $P_{IM}$ input of module access control circuit $6^1$. It should be observed here that the "1" signal is applied to the $P_{IM}$ input of the circuit $6^0$, is terminated by circuit $6^0$ and does not propagate through to the $P_{OM}$ output of the circuit $6^0$. This results from the application of the "O" signal from the resolver circuit $5^0$, indicating, in this case, that memory module $4^0$ contains a candidate location, to the $M_W$ input of the control circuit $6^0$.

Again referring to the truth table (FIG. 8), it can be seen that the signal generated at the $P_{OM}$ output of a module access control circuit is equal to "O" when the signals applied at the $E_I$ and $P_{IM}$ inputs of the circuit are both equal to "O." It will be recalled that "O" signals are generated at the outputs $d^0$ through $d^{M-2}$ of the encoder/decoder 7 (FIG. 1). Thus, the signals applied to the $E_I$ inputs of the module access control circuits succeeding the control circuit $6^0$ on the module propagation bus, not including module access control circuit $6^{M-1}$, are equal to "O." Therefore, since the module access control circuit $6^1$ receives "O" signals on both its $P_{IM}$ and $E_I$ inputs, it too generates a "O" signal at its $P_{OM}$ output. In addition, this "O" signal propagates to the $P_{OM}$ output of each succeeding control circuit until it is ultimately applied to the $P_{IM}$ input of the module access control circuit $6^{M-1}$ which is the only circuit 6 having a "1" signal applied to its $E_I$ input.

At this point it is necessary to turn attention to the signals appearing at the $E_O$ outputs of the respective module access control circuit 6. Specifically, it will be recalled that a "1" signal is applied to the $P_{IM}$ input and a "O" signal is applied to the $M_W$ input of the module access control circuit $6^0$. As was observed above, with these inputs the signal generated at the $E_O$ output of the circuit $6^0$ and applied to the $e^0$ input of the encoder/decoder 7 is equal to "1." It should be recalled from the preceding discussion that the signals applied to the module access control circuits $6^1$ through $6^{M-2}$ on their respective $E_I$ and $P_{IM}$ inputs are all equal to "O." As a result, referring to FIG. 8, "O" signals, generated at the $E_O$ outputs of each of them, are applied to the inputs $e^1$ through $e^{M-2}$, respectively, of the encoder/decoder 7. Finally, the signal applied to the $P_{IM}$ input of the control circuit $6^{M-1}$ is equal to "O.". Since it was assumed above that one of the resolver flip-flops 74 (FIG. 3) in the resolver circuit $5^{M-1}$ is in the set state, and there are no candidate storage locations in memory module 4 $4^{M-1}$, the signal at the $M_{RO}$ output of the resolver $5^{M-1}$ is equal to "1." This signal is applied to the $M_W$ input of the module access control circuit $6^{M-1}$. Referring to the truth table of FIG. 8 it can be seen that under these circumstances the signal at the $E_O$ output of module access control circuit $6^{M-1}$ (FIG. 1) is equal to "O." Thus, the only input of the encoder/decoder 7 to which a "1" signal is applied is the input $e^0$. As a result, the encoder/decoder 7 generates a code $C^0$ uniquely identifying the input $e^0$ and applies it to the inputs of the register 1.

At a time following the initiation of the current associative search operation when all of the propagating signals should have settled to the conditions described above, the aforementioned control circuit 2 generates a strobe pulse such as described earlier. The strobe pulse is conducted on the control signal bus 32 to the module resolver circuit 5 wherein it is applied to the C inputs of the respective resolver flip-flops 74 (FIG. 3). In addition, the pulse is also conducted on line 31 to the address register 1 (FIG. 1). As a result, substantially simultaneously with the occurrence of the pulse, the address register 1 stores the code $C^0$ appearing at its inputs. In addition, in a manner similar to that described in detail in conjunction with the discussion of the module resolver circuit 5, the set resolver flip-flop 74 (FIG. 3) in the module resolver circuit $5^{M-1}$ (FIG. 1) is reset and the resolver flip-flop 74 (FIG. 3) in the location access control circuit $8^{N-2}$ contained in the module resolver circuit $5^0$ is set. As a result, the storage location accessed when an access pulse is subsequently generated by the control circuit 2 (FIG. 1) is the location $L^{N-2}$ in the memory module $4^0$.

From the above discussion it is important to note that the address register 1 is used to store a unique code which specifies the module access control circuit 6 from which a "1" signal is propagated on the aforementioned module propagation bus. The stored code, in effect, identifies the memory module containing the storage location in which the search is to begin for the candidate storage location to be selected for accessing in the next associative search operation.

It is also important to note that the flow of signals on the module and location propagation buses operates to create an ordered relationship between the location access control circuits 8 in the plurality of module resolver circuits 5. Specifically, from the standpoint of the positioned relationship of the location access control circuits 8, the combination of propagation buses of FIG. 1 appears the same as the simple serial bus connection described in connection with the module resolver circuit 5. For example, in operation the location access control circuit $8^{N-1}$ in the module resolver circuit $5^0$ is considered positionally nearer, with respect to signals on the two propagation buses, to any location access control circuits in the module resolver circuit $5^{M-1}$ than is any location access control circuit in the module resolver circuit $5^1$. The significance of this observation can be appreciated by reflecting upon the previously described illustration.

More specifically, it will be recalled that it was initially assumed above that both the locations $L^{N-2}$ and $L^{N-1}$ in the memory module $4^0$ and the location $L^0$ in the module $4^1$ are candidate locations for accessing based on the search criterion last used. It should, therefore, be noted that it was the location $L^{N-2}$ which was selected for accessing above. This selection resulted from the fact that the location access control circuit $8^{N-2}$ is nearer on the combined propagation bus to the initiation point of the propagation "1" signal in the module resolver circuit $5^{M-1}$ than is either of the location access control circuits for the other candidate locations. By analysis similar to that used above, if another associative search operation is conducted using the same criterion as used above, the location $L^{N-1}$ in the memory module $4^0$ will be selected for accessing. The location access control circuit $8^{M-1}$ in module resolver $5^0$ is nearer the initiation point for the propgating "1" signal, namely the location access control circuit $8^{M-2}$ in the same module resolver circuit, than is the location access control circuit $8^0$ in the module resolver circuit $5^1$.

In the preceding discussion the signal on the K input of the module access control circuit 6 was assumed equal to "O." It can be seen on FIG. 1 that the K inputs of all of the circuits 6 are connected by the line 30 to an output of the control circuit 2. A "1" signal is produced on the line 30 only under program control. When the control circuit 2 produces a "1" signal on line 30, a "1" signal (FIG. 8) is generated at the $M_M$ outputs of all of the module resolver circuits 6 (FIG. 1). As a result, a resolver flip-flop 74 (FIG. 3) is set in each module resolver circuit 5 (FIG. 1) associated with a memory module 4 containing a candidate storage location. The resolver flip-flop 74 (FIG. 3) set in each circuit 5 is contained in the location access control circuit 8 associated with a candidate location which control circuit is nearest on the location propagation bus to the input $M_{Ri}$ of the circuit 5. By so doing, a group of locations can be accessed, usually for writing new data therein.

The above has described a specific embodiment of applicant's invention. It is believed that upon reading this application many embodiments of applicant's invention equally within its spirit and scope will become apparent to those skilled in the art.

What is claimed is:

1. A resolver for an associative memory arrangement, said arrangement comprising a plurality of ordered memory modules each comprising a plurality of ordered storage locations each of which generates signals indicating whether the respective location comprises data matching any selected associative search criterion, said resolver comprising:

first storage means for storing first signals identifying any selected storage location;

second storage means for storing second signals identifying any selected memory module;

selection means coupled to said storage locations and coupled to said first and second storage means and responsive to said first signals stored in said first storage means and to said second signals stored in said second storage means for selecting for accessing the first storage locations containing data matching the selected search criterion and succeeding the storage location identified by said first signals and said second signals in the combined ordered arrangement of memory modules and storage locations;

means for storing in said second storage means signals identifying the particular memory module containing the storage location selected for accessing by said selection means; and means for storing in said first storage means signals identifying the storage location selected for accessing in said particular memory module.

2. A resolver for a memory arrangement, said arrangement comprising a plurality of memory modules, each comprising a plurality of storage locations, each of which storage locations generates association signals if its respective contents match any selected search criterion, said resolver comprising:

a first, unidirectional, signal propagation bus;

means for storing code signals;

decoder means, comprising a plurality of output lines, coupled to said means for storing code signals, to generate control signals on said plurality of output lines;

a plurality of module access circuits serially connected by said first, unidirectional, signal propagation bus and individually coupled to corresponding ones of said memory modules and said output lines, each of said module access circuits being responsive to control signals appearing on the output line to which it is respectively coupled for generating propagation signals on said first, unidirectional, signal propagation bus for propagation to the respective succeeding module access circuit on said first, unidirectional, signal propagation bus;

each of said module access circuits comprising: a plurality of control circuits individually coupled to corresponding ones of the storage locations in the memory module to which the respective module access circuit is coupled; and a second, unidirectional, signal propagation bus serially interconnecting said control circuits and comprising an output terminal;

each of said control circuits comprising: a storage means; output logical means connected to said storage means for generating first signals for propagation to the respective succeeding control circuit on said second, unidirectional, signal propagation bus if said storage means stores a selected signal; and first logical means responsive to the reception of said first signals from a preceding control circuit on said second, unidirectional, signal propagation bus and to said association signals from the storage location to which the respective control circuit is connected for generating said selected signal.

3. The resolver in claim 2 wherein each control circuit further comprises second logical means responsive to the reception of said first signals on said second, unidirectional, signal propagation bus and to said association signals for generating second signals;

wherein said output logical means is further connected to said second logical means and is responsive to said second signals when said storage means does not store said selected signal to generate said second signals for propagation to the respective succeeding control circuit on said second, unidirectional, signal propagation bus.

4. The resolver of claim 3 wherein each of said module access circuits further comprises means for logically combining the following signals to generate said propagation signals for propagation to said respective succeeding module access circuit; said control signals; said propagation signals appearing on said first, unidirectional, signal propagation bus from the respective preceding module access circuit; and signals at said output terminal of the respective second, unidirectional, signal propagation bus.

5. The resolver of claim 4 wherein said first, unidirectional, signal propagation bus is reentrant.

6. The resolver of claim 4 further comprising:

an encoder circuit, comprising a plurality of input terminals, for generating code signals;

wherein each of said module access circuits further comprises: means connected to a corresponding input terminal of said encoder circuit and responsive to the propagation signals generated by the respective module access circuit for generating an information signal on said input terminal of said encoder circuit;

wherein said means for storing code signals comprises a register connected to said encoder circuit;

wherein said decoder means generates control signals comprising a first logical signal on one of said plurality of output lines and a second logical signal on all other of said plurality of output lines.

7. The resolver of claim 6 wherein said first, unidirectional, signal propagation bus is reentrant.

8. A resolver for a memory arrangement, said arrangement comprising a plurality of ordered storage locations grouped into a plurality of memory modules, wherein each storage location generates association signals indicating whether its respective contents match any selected associative search criterion, said resolver comprising:

means for storing code signals;

means, comprising a plurality of output lines, connected to said means for storing code signals and responsive to stored code signals for generating output signals on said plurality of output lines;

a plurality of control means individually connected to corresponding ones of said memory modules and corresponding ones of said output lines;

a first, unidirectional, propagation bus, serially connecting said control means;

each control means comprising: a module resolver circuit connected to said corresponding memory module; and a module access control circuit connected to said module resolver circuit and to said corresponding output line;

each module resolver circuit comprising: a resolver input terminal; a resolver output terminal; a plurality of control circuits, individually connected to corresponding ones of the storage locations in the memory module connected to the respective module resolver circuit; a second, unidirectional, propagation bus connecting said control circuits in series between said resolver input terminal and said resolver output terminal; each of said control circuits comprising: storage means; first logical means connected to said second, unidirectional, propagation bus and to said corresponding storage location for storing signals in said storage means; and second logical means connected to said storage means for generating control signals on said second, unidirectional, propagation bus;

each module access control circuit comprising logical means for logically combining the following signals: signals appearing at the resolver output terminal of the respective module resolver circuit; signals on said first, unidirectional, propagation bus from the preceding control means; and signals on the output line to which the respective module access control circuit is connected, to generate module access signals on said first, unidirectional, propagation bus for propagation to the succeeding control means;

each module access control circuit further comprising logical means responsive to said module access signals generated by the respective module access control circuit to generate access signals; and encoder means connected to said module access control circuits and responsive to said access signals for generating code signals;

said means for storing code signals being connected to said encoder means.

9. The resolver of claim 8 wherein said first, unidirectional, signal propagation bus is reentrant.

10. A resolver for a memory arrangement, said arrangement comprising a plurality of memory modules, each module comprising a plurality of storage locations, wherein each of said storage locations generates signals indicating whether its respective contents match any selected search criterion, said resolver comprising:

a plurality of module access circuits;

a unidirectional, module propagation line connecting said module access circuits in a reentrant series;

each module access circuit comprising: a plurality of control circuits individually connected to corresponding ones of the storage locations in a memory module corresponding to the respective module access circuit, a unidirectional, control circuit propagation line having an input port and an output port; said control circuits being connected in series by said unidirectional, control circuit propagation line between said input port and said output port; wherein each of said control circuits comprises means responsive to signals on said unidirectional, control circuit propagation line and to said signals indicating whether the contents of the respectively connected storage location match the selected search criterion, for generating control circuit propagation signals on said unidirectional, control circuit propagation line;

an encoder comprising a plurality of input lines for generating a unique code corresponding to one line of said plurality of input lines to which selected logical signals are applied;

a register connected to said encoder for storing codes generated by said encoder;

a decoder comprising a plurality of output lines, connected to said register and responsive to the codes stored in said register for generating an enable signal on one of said plurality of output lines;

wherein each of said module access circuits further comprises: an input terminal connected to an output line, corresponding to the respective module access circuit, of said plurality of output lines of said decoder; an output terminal connected to an input line, corresponding to the respective module access circuit, of said plurality of input lines of said encoder; logical means connected to said module propagation line and responsive to signals on said module propagation line from the respective preceding module access circuit to generate control circuit propagation signals at the input port of the control circuit propagation line for the respective module access circuit; and means for logically combining signals appearing at said input terminal of the respective module access circuit and said signals on said module propagation line to generate first module access control signals.

11. The resolver of claim 10 wherein each module access circuit further comprises means for logically combining said first module access control signals with signals appearing at the output port of the control circuit propagation line for the respective module access circuit, for generating module propagation signals for propagation to the respective succeeding module access circuit on said module propagation line.

12. The resolver of claim 11 wherein each module access circuit further comprises means for logically combining said first module access control signals and said module propagation signals to generate logical signals at said output terminal of the respective module access circuit.

13. A resolver for a memory arrangement, said arrangement comprising a first memory module including a plurality of ordered storage locations, and a second memory module including a plurality of ordered storage locations, wherein each storage location generates signals indicating whether its contents match any selected associative search criterion, said resolver comprising:

- a first module resolver circuit connected to said first memory module;
- a second module resolver circuit connected to said second memory module;
- wherein each of said module resolver circuits comprises: an input terminal; an output terminal; and a plurality of control circuits individually connected to corresponding ones of said storage locations in the memory module to which the respective module resolver circuit is connected;
- each control circuit comprising: an input terminal; an output terminal; and means for logically combining signals appearing at said input terminal of the control circuit and said signals indicating whether the contents of the storage locations to which the respective control circuit is connected match the selected associative search criterion, for generating control propagation signals at said output terminal of the control circuit;
- wherein each of said module resolver circuits further comprises: means for respectively connecting the output terminal of each control circuit, respectively connected to a storage location in a memory module, to the input terminal of the control circuit connected to the respective succeeding storage location in that memory module; means for connecting the input terminal of the respective module resolver circuit to the input terminal of the control circuit connected to the first storage location in the memory module to which the respective module resolver circuit is connected; and means for connecting the output terminal of the control circuit connected to the last storage location in the respective memory module to the output terminal of the respective module resolver circuit;
- a first module access control circuit comprising: a first input terminal connected to the output terminal of said first module resolver circuit; a second input terminal; a first output terminal; and a second output terminal connected to the input terminal of said first module resolver circuit; and
- a second module access control circuit comprising: a first input terminal connected to the output terminal of said second module resolver circuit; a second input terminal connected to said first output terminal of said first module access control circuit; a first output terminal; and a second output terminal connected to said input terminal of said second module resolver circuit;
- each of said module access control circuits comprising: logical means responsive to signals appearing at the first input terminal of the respective module access control circuit to generate control circuit propagation signals at the second output terminal of the respective module access control circuit; and logical means for logically combining signals appearing at the first and second input terminals of the respective module access control circuit, for generating module propagation signals at the first output terminal of the respective module access control circuit.

14. A resolver for an associative memory arrangement, said arrangement comprising a plurality of ordered associative memory modules, each module comprising a plurality of storage locations, said resolver comprising:

- a storage register comprising input terminals and output terminals;
- an encoder comprising: output terminals connected to said input terminals of said storage register; and input terminals;
- a decoder comprising: input terminals connected to said output terminals of said storage register; and output terminals;
- a plurality of first control means each of which is individually connected to a corresponding one of said memory modules, each of said first control means comprising: an input terminal; an output terminal; and means connected to the input terminal of the respective first control means for generating signals at said output terminal of the respective first control means indicating whether or not the data stored in a storage location in the memory module to which the respective first control means is connected match a selected associative search criterion;
- a plurality of second control means individually connected to corresponding ones of said first control means, each second control means comprising: a first input terminal; a second input terminal connected to the output terminal of the first control means to which the respective second control means is conneced; a third input terminal connected to an output terminal, corresponding to the respective second control means, of said decoder; a first output terminal; a second output terminal; and means for logically combining signals appearing at said first, second, and third input terminals of the respective second control means to generate control signals at said first output terminal of the respective second control means and decoder input signals at said second output terminal of the respective second control means;
- means for respectively connecting said second output terminals of said plurality of second control means to input terminals, corresponding to the respective second control means, of said encoder; and
- means for respectively connecting the first output terminal of each second control means connected to a first control means which is connected to a memory module to the first input terminal of the second control means connected to the first control means which is connected to the respective succeeding memory module.

* * * * *